(12) United States Patent
Ramaswamy

(10) Patent No.: US 6,295,647 B1
(45) Date of Patent: Sep. 25, 2001

(54) CONTEXT LIFE TIME MANAGEMENT OF A USER INTERFACE IN A DIGITAL TV BROADCAST

(75) Inventor: Muralidharan Ramaswamy, Danbury, CT (US)

(73) Assignee: Philips Electronics North America Corp., New York, NY (US)

( * ) Notice: Subject to any disclaimer, the term of this patent is extended or adjusted under 35 U.S.C. 154(b) by 0 days.

(21) Appl. No.: 09/168,412

(22) Filed: Oct. 8, 1998

(51) Int. Cl.$^7$ ................................................ H04N 7/173
(52) U.S. Cl. ...................... 725/116; 725/136; 375/240.26
(58) Field of Search .................. 348/13, 589, 465, 348/6, 10, 423, 461, 469, 473, 474, 468; 455/5.1; 370/465, 522, 514; 375/240.26; 725/109, 112, 113, 114, 116, 117, 118, 144, 136, 146, 147, 148

(56) References Cited

U.S. PATENT DOCUMENTS

| | | | |
|---|---|---|---|
| 4,785,397 | * 11/1988 | Koizumi et al. ...................... | 364/200 |
| 5,289,276 | * 2/1994 | Siracusa et al. ...................... | 348/467 |
| 5,343,300 | * 8/1994 | Hennig ................................ | 348/478 |
| 5,410,369 | * 4/1995 | Nakajima ............................ | 348/730 |
| 5,488,736 | * 1/1996 | Keech et al. ......................... | 395/800 |
| 5,506,615 | * 4/1996 | Awaji .................................. | 348/7 |
| 5,818,438 | * 10/1998 | Howe et al. ........................ | 348/327 |

FOREIGN PATENT DOCUMENTS

9613119A1    5/1996   (WO) .

* cited by examiner

Primary Examiner—Victor R. Kostak
(74) Attorney, Agent, or Firm—Russell Gross

(57) ABSTRACT

In a digital television broadcast that contains executable code segments that are associated with specific video segments, a context duration time is defined for each executable component. The context duration time is determined so as to correspond to the context of the video segment that is associated with the executable component. In a preferred embodiment, the context duration time for the executable component is determined when the corresponding video segment is being prepared for encoding into the transport stream. The context duration time is subsequently included in the encoding of the executable component in the transport stream. When the executable component is decoded from the transport stream, the context duration time is used to effect a termination of the executable component after the context duration time has elapsed. In this manner, each launched executable component will be terminated within a predetermined time from the start of execution of the executable component, independent of the subsequent contents of the transport stream.

18 Claims, 4 Drawing Sheets

CONTEXT LIFE TIME MANAGEMENT OF A USER INTERFACE IN A DIGITAL TV BROADCAST

BACKGROUND OF THE INVENTION

1. Field of the Invention

This invention relates to the field of communications, and in particular to the field of digital television broadcasts with embedded interactive applications.

2. Description of Related Art

The broadcast of television signals in a digital format provides for the transmission of data packets, as well as the conventional video and audio packets. The data packets may contain ancillary information related to the video and audio packets. The data packets may also contain code that is executable on a computer, such as a set-top box, a computer embedded in the television receiver, or a convention personal computer. By transmitting executable code, a user may interact with the computer in the context of the video and audio information being transmitted. That is, for example, when a product is being advertised, the executable code may be configured to allow the user to place an order for that product.

Conventionally, digital television signals are transmitted as a series of packets that form a transport stream. The MPEG-2 standard includes a means for identifying each packet of digital information as containing video, audio, or interaction information. In a conventional digital television with interactive capabilities, the packets are demultiplexed from the transport stream into separate video, audio, and data streams. The video and audio streams are processed by video and audio decoders, respectively, and the data streams are stored to memory by an application processor, and subsequently launched for execution. The data stream typically consists of multiple packets that form each executable component of code. Typically, the launched executable component effects a display of one or more buttons for subsequent user selection. For example, during a product advertisement, the executable component associated with the advertisement may display a button that reads: "Press here for additional information", or a note that reads: "Press 1 on your remote control to purchase this product". When the user activates the appropriate button, the executable component proceeds to effect the display of additional information. The additional information may be contained within the executable component, or it may be contained in an independent data component or produced by another executable component.

Multiple executable components may be associated with one or more segments of the video or audio streams. For example, on a shopping channel, products are presented sequentially, and a variety of products may be displayed on the television screen at the same time. Each product related executable component in this example would be configured to display a distinct message, such as "Press here to order the bicycle", "Press here to purchase the diamond ring", and so on. The executable components may be independent, or they may be components of a larger application. For example, a general purpose application may be associated with a particular selling program that contains the commonly used code for securing credit card information and the like, and each product related executable component is designed to be a part of the general application program.

To synchronize the execution of each executable component, queue markers are placed in the video stream. A first queue marker is used to notify the application processor when to start a particular executable component, and another queue marker identifies when the application processor may terminate the executable component and remove the component from memory. This synchronization process, however, is problematic. The detection of queue markers in the video streams requires a continual monitoring of the stream for these markers, which increases the complexity of the video processor, and may impact the overall performance and cost of the interactive television system.

Most video streams conform to protocols, such as MPEG, that compensate for bandwidth congestion by dynamically adjusting the content of each video frame. In such protocols, information in the video frames will be discarded whenever there is insufficient bandwidth to transmit the frames in their entirety. Thus, there is a likelihood that one or more queue markers in the original encoding of the video stream will be discarded or lost through the encoding-transmission-decoding process associated with conventional digital television broadcasting. If an initial queue marker is missing, the execution component will not be launched; if the terminal queue marker is missing, the component will remain active outside the context of the video stream. A similar difficulty will arise when a user changes the source of the transport stream, for example, by changing channels on the television receiver. If the terminal queue marker is missing because the user changed the channel before the corresponding advertisement ends, the execution component will remain active outside the context of the video stream. The user will be given the option, for example, of purchasing an item without a corresponding video reference to the item. Therefore, a need exists for a means of initiating and terminating each execution component that is independent of the received video stream.

BRIEF SUMMARY OF THE INVENTION

It is an object of this invention to effect the synchronization of executable components of a digital television broadcast to corresponding segments of a video stream without relying on a continuous or complete reception of the original contents of the video stream.

This object and others are achieved by assigning a "life time" to each executable component. The life time is determined so as to be within the context of the video segment that corresponds to the executable component. In a preferred embodiment, the context life time duration for the executable component is determined when the corresponding video segment is being prepared for encoding into the transport stream. The context duration time is subsequently included in the encoding of the executable component in the transport stream. When the executable component is decoded from the transport stream, the context duration time is used to effect a termination of the executable component after the context duration time has elapsed. In this manner, each launched executable component will be terminated within a predetermined time, independent of the subsequent contents of the transport stream.

DETAILED DESCRIPTION OF THE INVENTION

Figure 1:
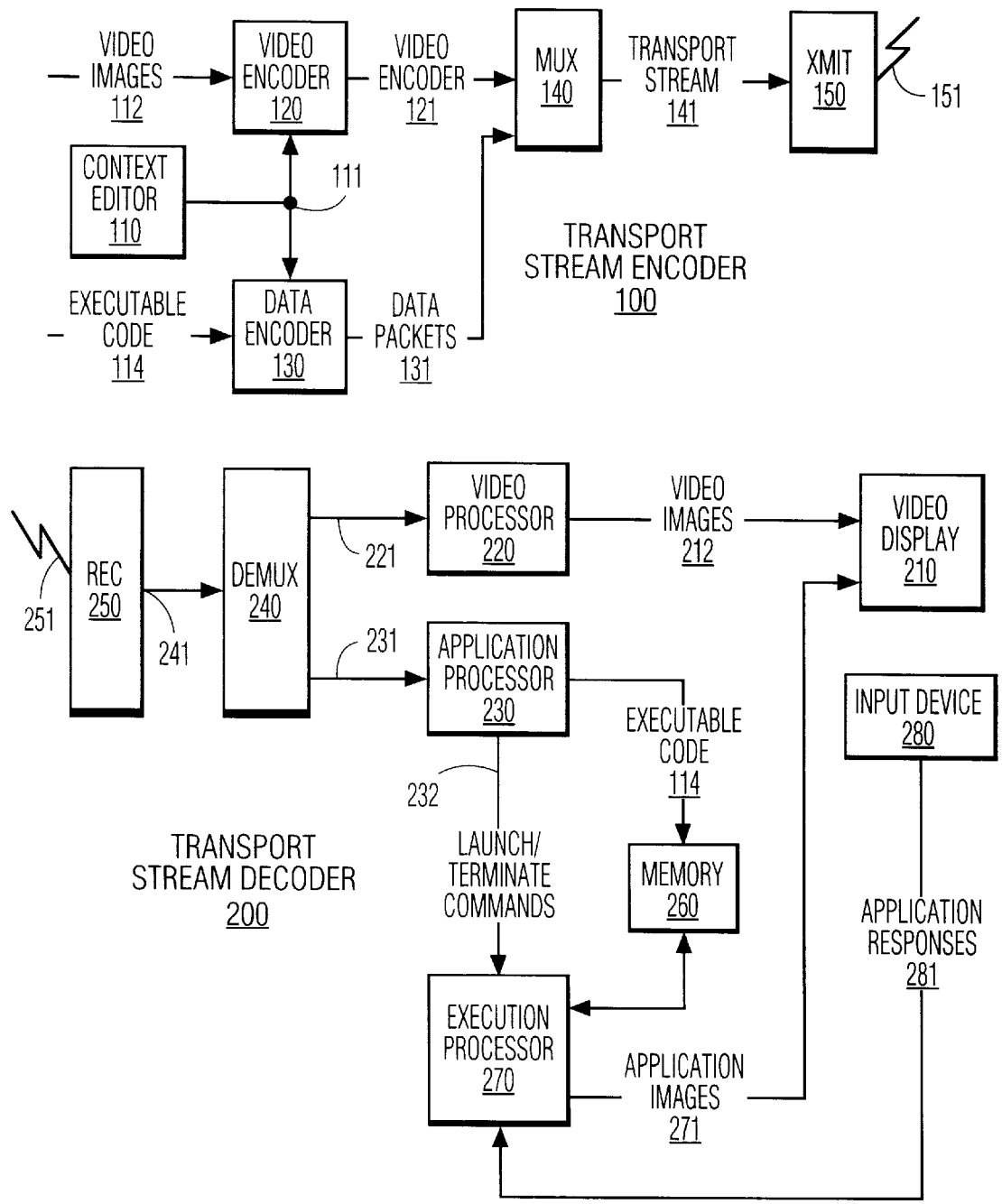
FIG. 1 illustrates an example block diagram of a transport stream encoder and transport stream decoder in accordance with this invention.

FIG. 1 illustrates an example block diagram of a transport stream encoder 100 and a transport stream decoder 200. Video images 112 and executable code 114 are encoded into packets 121, 131 respectively for inclusion in a transport stream 141. For ease of understanding, only video images 112 and executable code 114 are illustrated, although the transport stream 141 may contain other components, such as audio and other packets. In the example of FIG. 1, a context editor is used to associate the executable code 114 to a particular segment of video images 112. In a preferred embodiment of this invention, the context editor determines how long the segment of video images 112 will be displayed on a video display 210. During the time the segment is displayed, the associated executable code 114 will be "in context" with the video images 112 that are being displayed. Before and after the associated images 112 are displayed, the executable code 114 will be "out of context". That is, an executable code 114 that displays a "Press here to purchase the bicycle" button will be out of context, and effectively meaningless, some time before and some time after an image of the bicycle appears on the display. Based on the duration of the display of associated images 112, the context editor determines an appropriate context duration time parameter that defines the length of time that the executable code 114 is expected to be in context with the video images 112. In a preferred embodiment, the context duration time parameter is an integer representing the context duration time in seconds. Alternatively, the context duration time parameter is an encoding from which the actual context duration time can be determined, such as the number of hundreds of video frames, or the number of predefined decoder clock cycle periods. After the period of time defined by the context duration time parameter, the executable code 114 becomes effectively meaningless, and may be terminated.

The video images 112 are encoded into video packets 121 by a video encoder 120, and the executable code is encoded into data packets 131 by a data encoder 130. As is common in the art, segments of video images 112 are encoded with a display start time that identifies when each segment of video images 112 are to be displayed. For example, in an MPEG compliant encoding, each video frame has one or more time parameters that are referenced to a real time clock PCR. In a preferred embodiment of this invention, a context start time that is based on the display start time is included in the encoding of the executable code 114. In this manner, the synchronization of the executable code 114 to the video images 112 can be substantially independent of the sequencing of the video packets 121 and data packets 131 in the transport stream 141. In an alternative embodiment of this invention, the placement of data packets 131 amongst the video packets 121 in the transport stream determines when the executable code that is contained in the data packets 131 is executed. In this alternative embodiment, the context duration time will be defined to be somewhat longer than the corresponding display duration time, to allow for the imprecision between the time that the executable code will be executed and the time that the segment of video packets surrounding this executable code in the transport stream will be displayed. The context start time and context duration time may also be dependent upon the effects of the executable code 114. If the executable code 114 requires a particular set-up time to produce an application image that corresponds to the segment of video images, the context start time, if provided, and the context duration time are suitably adjusted to allow for this set-up time. That is, in a preferred embodiment of this invention, the context duration time will be defined to be equal to the display duration time plus an appropriate butter factor that is dependent upon the degree of coincidence between the start of the display of video images and the start of the display of corresponding application images.

The video packets 121 and data packets 131 are multiplexed by multiplexer 140 to form the transport stream 141 that is transmitted to a receiver 250 via a transmitter 150 as a communications signal 151. The term packet is used herein to define identifiable and distinguishable entities of information, and the term multiplexer defines a technique for combining packets such that they can be subsequently de-multiplexed to substantially reproduce these original identifiable and distinguishable entities of information. Similarly the transmitter 150 and communications signal 151 symbolically identify a means of communicating the transport stream 141 to a receiver, as would be evident to one of ordinary skill in the art.

The transport stream decoder 200 receives the transmitted communications signal 151 via a receiver 250 and produces a reproduced transport stream 241. Ideally, the transport stream 241 is identical to the transport stream 141. The reproduced transport stream 241 is demultiplexed to produce therefrom video packets 221 and data packets 231 corresponding substantially to the video packets 121 and data packets 131, respectively. The video packets 221 are processed by a video processor 220 to produce video images 212, and the data packets 231 are processed by an application processor 230 to reproduce executable code 114. It should be noted that, consistent with conventional encoding techniques, the encoding of the video images 112 to video packets 121 is not necessarily loss free. Due to bandwidth constraints, the video packets 121 may contain less resolution and detail than the video images 112. Similarly, the transmitter 150 may omit thetransmission of some packets due to media congestion, or the transmission media between the transmitter 150 and receiver 250 may adversely affect some packets.

Although the video images 212 may be an imprecise reproduction of the video images 112, techniques are applied as required to effect the accurate and precise reproduction of executable code 114 from the application processor 230. That is, for example, each data packet 131 is assigned a sequential packet number and contains a error detection code. If the received data packets 231 show a gap in the sequence or packet numbers, or an error code detects an error in a packet, the transport stream decoder 200 requests a retransmission of a particular packet from the transport stream encoder 100. In the example of a broadcast transmission from the transport stream encoder 100, for which feedback from the transport stream decoder 200 is infeasible, the transport stream encoder 100 transmits redundant copies of each data packet 131. In this example, the application processor 230 ignores the redundant packets after an error free packet is decoded. Additionally, the data packets 131 in this example contain error correction codes that allow for the correction of detected errors. If none of the redundant packets for a particular packet sequence number is decoded error free, the executable code 114 is not produced by the application processor 230 for this sequence of data packets. These and other techniques for reliable data communications are common to one of ordinary skill in the art.

The application processor 230 stores the executable code 114 in a memory 260 for execution by an execution processor 270. As would be evident to one of ordinary skill in the art, the video processor 220, application processor 230, and execution processor 270 may be independent or dependent processes that operate in a single physical entity, but are presented herein as discrete processors for clarity and ease of understanding. The application processor 230 launches the executable code 114 by communicating a launch command to the execution processor 270 via the link 232. The application processor 230 determines when to launch the executable code 114 based upon the methods used to encode the context time parameters. If a specific context start time is encoded in the sequence of data packets 131, the application processor 230 issues the launch command to the execution processor (270) to effect the commencement of the execution at the specified context start time. If a specific context start time is not encoded, the application processor 230 issues the launch command immediately after loading the executable code 114 in the memory 260. The execution of the executable code 114 typically produces one or more application images 271 for display on the video display 210. The application images 271 are displayed with the video images 212 corresponding to the segment of video packets 221 that are associated with the executable code 114. The executable code 114 also allows a user (not shown) to input application responses 281 in response to the displayed application images 271. An application response 281 may be, for example, the closure of a switch on a mouse when the mouse pointer is placed above a "Click here" button on the display 210.

The application processor 230 also determines the context duration time parameter from the received data packets 231. As discussed above, the context duration time parameter defines how long the executable code 114 can be expected to be in context with the video images 212 that are being displayed on the video display 210. The application processor 230 communicates a termination command to the execution processor 270 that effects a termination of the executable code 114. In a preferred embodiment, the application processor 230 communicates the termination command to the execution processor 270 at the same time that it communicates the execute command. In this embodiment, the termination command contains the context duration time parameter, and the execution processor 270 effects a count-down process based on the context duration time parameter, and terminates the executable code 114 at the end of the context time duration. In an alternative embodiment, the application processor effects the count-down process based on the context duration time parameter, and issues a termination command at the end of the context time duration. In response to this termination command, the execution processor 270 terminates the execution of the executable code 114. In an alternative embodiment, if application responses 281 are received in response to the executable code, the execution processor 270 delays the termination of the executable code 114 until the user completes the transaction. In this manner, for example, the user's selection of "Click here to buy" extends the duration of the executable code 114 beyond the context time of the associated video segment, to allow the user sufficient time to enter the appropriate credit card and mailing information. In this embodiment, the execution processor 270 notifies the application processor 230 when the executable code 114 is terminated. After the executable code 114 is terminated, the application processor may place subsequent executable code 114 segments in the area of memory 260 that had contained the terminated executable code 114 segment.

Although presented thus far as a system for executing a single executable code 114, the encoder 100 and decoder 200 of this invention allows for the concurrent execution of multiple executable code segments 114, each associated with a specific segment of video images. Each sequence of data packets 131 corresponding to an executable code segment 114 is uniquely identified. Each launch and terminate command from the application processor contains an identifier that identifies the particular executable code segment 114 that is to be launched or terminated. In a straightforward implementation, for example, each active executable code segment 114 is identified by its starting address in the memory 260, and the launch and terminate commands each contain the executable code segment's starting address.

Figure 2:
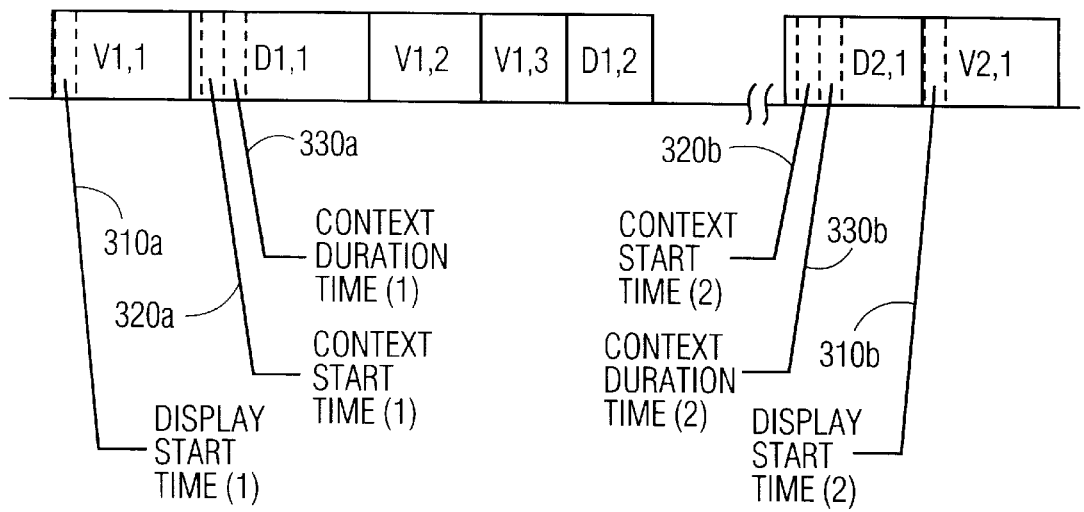
FIG. 2 illustrates an example transport stream in accordance with this invention

FIG. 2 illustrates an example transport stream. Packets V1,1, V1,2, and V1,3 represent a sequence of video packets 121 corresponding to a segment of video images 112. Packets D1,1 and D1,2 represent a sequence of data packets 131 corresponding to a segment of executable code 114. Packet V2,1 represents the start of a sequence of video packets 121 corresponding to a second segment of video images 112. Packet D2,1 represents the start of a sequence of data packets 131 corresponding to a second segment of executable code 114. In accordance with this invention, the sequences of data packets 131 each include a context duration time parameter; as illustrated in FIG. 2, these context duration time parameters 330a, 330b are contained in the first data packets D1,1 and D2,1 of the sequence of data packets corresponding to each executable code segment. Conventionally, the sequences of video packets 121 each contain a display start time 310a, 310b that identifies when each of the sequences are to be displayed. As discussed above, the sequences of data packets 131 may also contain a context start time 320a, 320b that is based upon the display start time 310a, 310b. Because the display start time 310a, 310b is typically not significantly different than the time that the video packets are actually received at the decoder 200, the context start time 320a, 320b may be omitted, provided that the execution of the executable code associated with the received video packets commences immediately after the executable code 114 is received.

Figure 3:
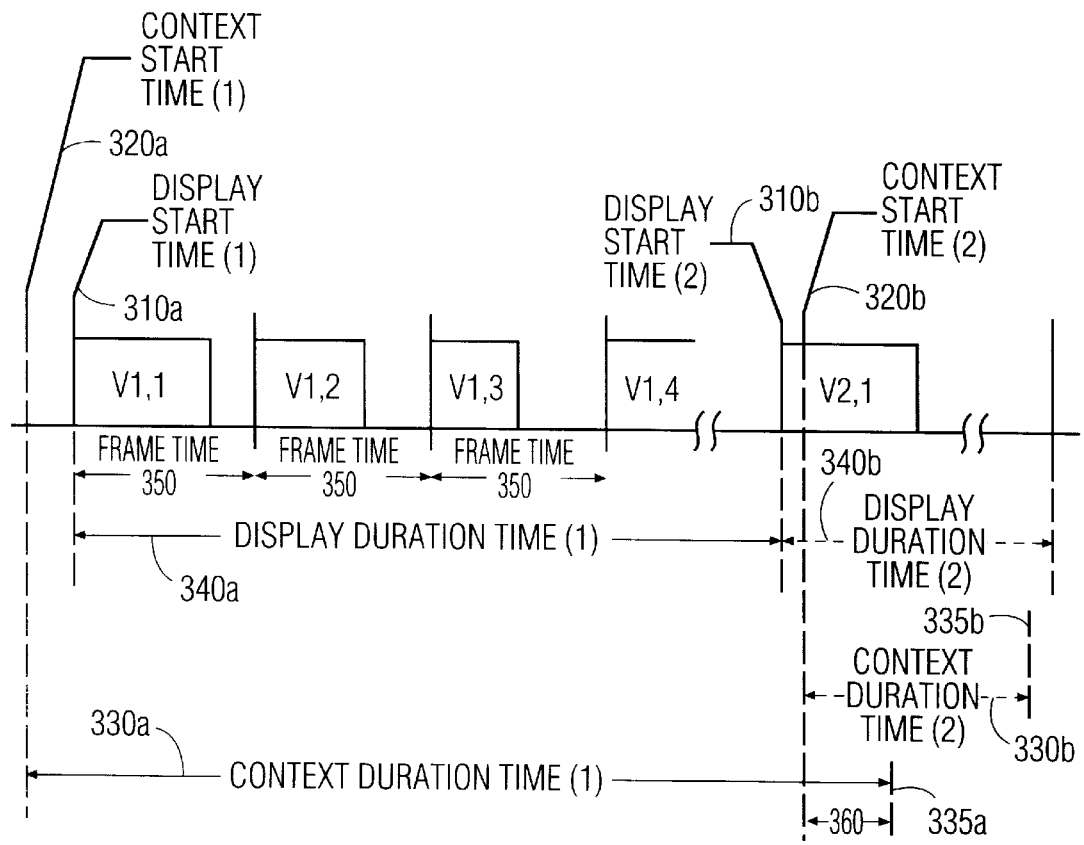
FIG. 3 illustrates an example timing diagram of video segments and corresponding context times in accordance with this invention.

FIG. 3 illustrates a timing diagram corresponding to the display of the example transport stream of FIG. 2. In this example, each video packet V1,1, V1,2, etc. corresponds to a frame of video information, and the frames are displayed at equal frame periods 350. The first frame of each sequence of video packets V1,1 and V2,1 start at the specified display start times 310a and 310b, respectively. Each subsequent video packet V1,2, V1,3, etc. occurs at subsequent frame periods 350. The execution of each segment of executable code 114 occurs at the context start times 320a and 320b, which may be expressly encoded in the sequence of data packets 131 or implied by the occurrence of the data packets in the transport stream amongst the sequence of video packets of its associated segment of video images, as discussed above. As illustrated in FIG. 3, the context start time 320a, 320b is correlated to the corresponding display start time 310a, 310b, but may occur before, after, or coincident with the display start time 310a, 310b. The context duration time 330a, 330b define how long each segment of executable code 114 remains in context with the display of the corresponding segment of video images 112. As with the context start time, the context duration time 320a, 320b is correlated to the duration 340a, 340b of the display of the corresponding segment of video images 112, but may be shorter, longer, or equal to the display duration time 340a, 340b. As illustrated in FIG. 3, during time period 360, both the first and second executable code segments are defined to be in context with their corresponding video image segments, even though the video image segments are non-overlapping in time. Corresponding to this timing diagram, the application processor 230 loads the first executable code segment into memory and communicates a "launch executable code segment 1" at context start time 320a to the execution processor 270, then loads the second executable code segment into memory and communicates a "launch executable code segment 2" at context start time 320b. At a point in time 335a that is equal to the context duration time 330a after the context start time 320a, the application processor 230 communicates a "terminate executable code segment 1" to the execution processor 270. At a point in time 335b that is equal to the context duration time 330b after the context start time 320b, the application processor 230 communicates a "terminate executable code segment 2" to the execution processor 270.

Figure 4:
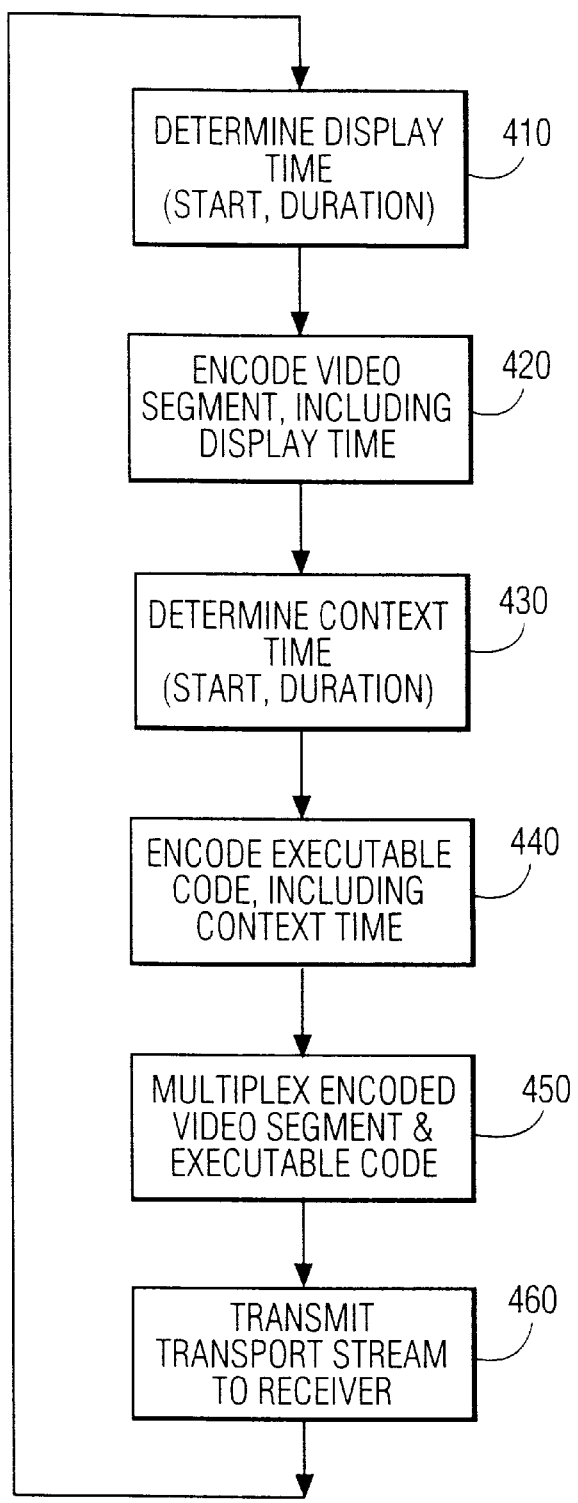
FIG. 4 illustrates an example flow chart for the encoding of video segments and corresponding executable components in accordance with this invention.

FIG. 4 illustrates an example flow diagram for the encoding of executable code segments having associated video image segments in accordance with this invention. At 410, the start and duration of the display of the video image segment is determined. At 420, the video segment is encoded, as well as the time to start the display of the video segment. At 430, the context time parameters, start and duration, are determined, based upon the display start and duration times. At 440, the executable code segment, if any, is encoded, as well as the context time parameters. As noted above, the explicit encoding of the context start time is optional, provided that the appropriate start time for the executable code can be determined implicitly, for example, by the occurrence of the data packets amongst the corresponding video segments in the transport stream. The encoded video segment and executable code segment are multiplexed to for the transport stream, at 450, and the transport stream is transmitted to the receiving system, at 460. This process 410–460 is repeated continually.

Figure 5:
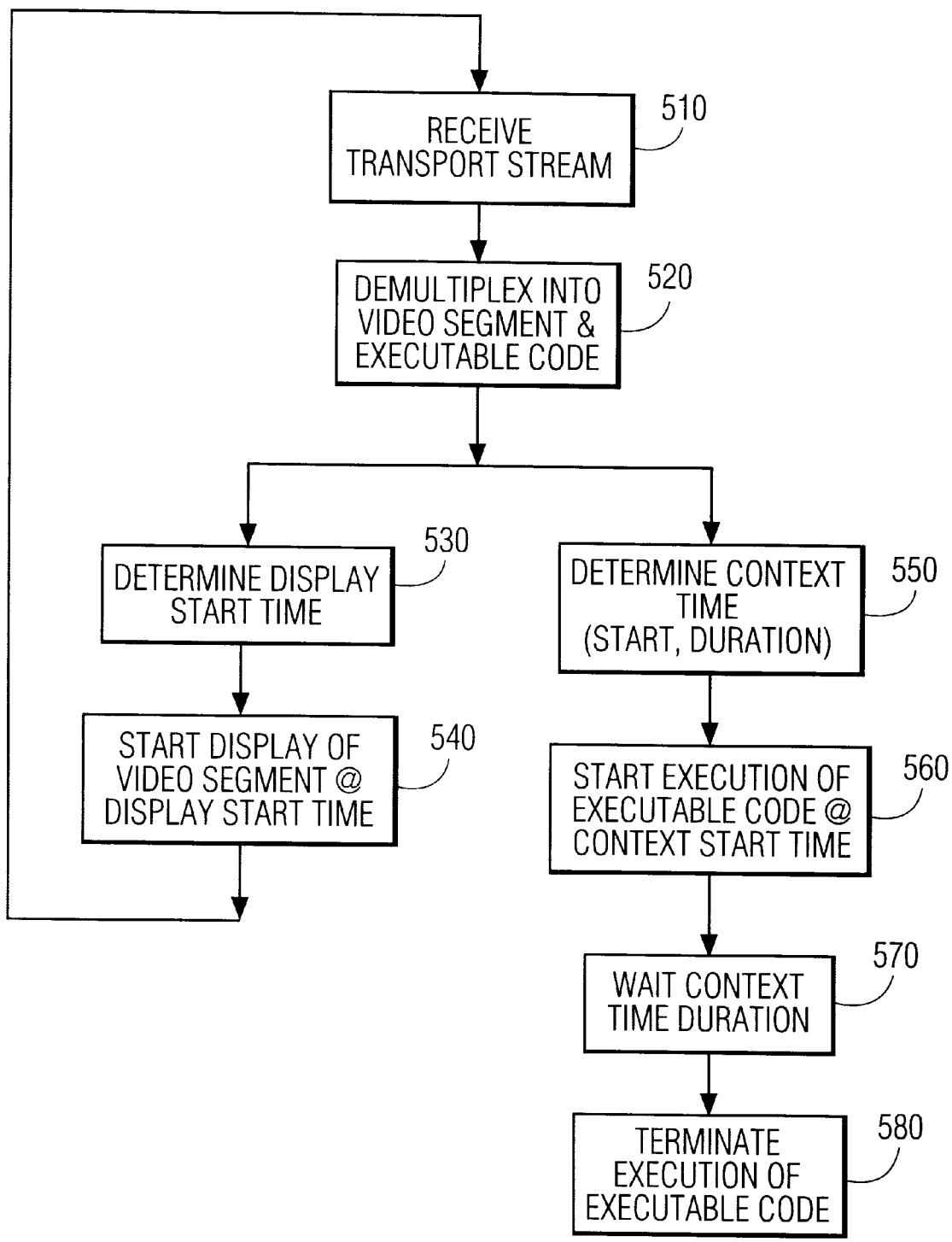
FIG. 5 illustrates an example flow chart for the processing of video segments and corresponding executable components in accordance with this invention.

FIG. 5 illustrates an example flow diagram for the decoding and execution of executable code segments having associated video image segments in accordance with this invention. The transport stream is received, at 510, and demultiplexed into a video segment and associated executable code segment, if any, at 520. The start time for the display of the video segment is determined, at 530, and the display of the video segment commences at this start time, at 540. If an associated executable code segment is present, the context time parameters are determined from the received sequence of data segments, at 550. The execution of the executable code commences at the express or implied context start time, at 560, and a count-down timer is initiated to effect a waiting, period corresponding to the context duration time parameter, at 570. After a period of time corresponding to the context duration time parameter, the execution of the executable code is terminated, at 560. As discussed above, in a preferred embodiment, the termination of the executable code will be postponed at 560 if the user is involved in a transaction that is dependent upon the currently executing executable code segment.

Note that the termination of the executable code at 560 is independent of the display of the corresponding segment of video images at 540. In this manner, if the sequence of video packets corresponding to the segment of video images is interrupted, the executable code corresponding to the incomplete segment of video images will be terminated within a finite period of time after the initiation of the executable code.

The foregoing merely illustrates the principles of the invention. It will thus be appreciated that those skilled in the art will be able to devise various arrangements which, although not explicitly described or shown herein, embody the principles of the invention and are thus within its spirit and scope. For example, a default maximum context duration time parameter may be defined, and the encoded context duration time parameter can be this default maximum time. In this manner, for example, a particular selling program may define a constant maximum duration time for each executable code segment, because each product will be displayed for the same amount of time. By using the default maximum duration time parameter, the encoding of the sequences of data packets can be simplified, because the context time of each product is known to be constant. It will also be appreciated by one of ordinary skill in the art that the transport stream encoder 100 and transport stream decoder 200 can be implemented in hardware, software, or a combination of both. For example, the video encoder 120 may be a dedicated hardware device, while the data encoder 130 and multiplexer 140 may be firmnware code that is executed on an embedded microprocessor. Similarly the partitioning of the functions within the encoder 100 and decoder 200 need not correspond to a partitioning of devices within the encoder 100 and decoder 200. For example, the multiplexer 140 and transmitter 150 may be a single transmission device, and the receiver 250 and demultiplexer 240 may be a single receiving device. Similarly, the executable code segments 114 may consist of a plurality of independent or dependent individual executable code segments. These and other optimization and partitioning options will be apparent to one of ordinary skill in the art and within the spirt and scope of this invention.

What is claimed is:

1. A transport stream encoder comprising:
   a video encoder that encodes video images into a sequence of one or more video packets, the video images having a determinable display duration time,
   a data encoder that encodes executable code into a sequence of one or more data packets, the sequence of one or more data packets containing a context duration time parameter that is based on at least one of:
      the display duration time of the video images, and
      a predetermined maximum duration time of the video images.

2. The transport stream encoder of claim 1, wherein:
   the sequence of one or more video packets also has a determinable display start time, and
   the sequence of one or more data packets also includes a context start time that is based on the display start time.

3. The transport stream encoder of claim 1, further including
   a multiplexer, operably coupled to the video encoder and the data encoder, that combines the sequence of one or more video packets and the sequence of one or more data packets into a transport stream to facilitate the transmission of the transport stream to a receiver.

4. The transport stream encoder of claim 3, wherein the transport stream is an MPEG-compliant transport stream.

5. The transport stream encoder of claim 3, further including a transmitter that transmits the transport stream to facilitate the reception of the transport stream at a transport stream decoder.

6. A transport stream decoder comprising:
- a demultiplexer that receives a transport stream and produces therefrom a sequence of one or more video packets and a sequence of one or more data packets, the sequence of one or more video packets previously encoded from video images,
- an application processor that processes the sequence of one or more data packets to produce executable code,
- a memory, operably coupled to the application processor, that stores the executable code, and
- an execution processor, operably coupled to the application processor and the memory, that executes the executable code in response to a launch command from the application processor, and terminates the executable code in response to a terminate command from the application processor, and wherein
- the sequence of one or more data packets contains a context duration time parameter based on display duration time of the video images, and the application processor communicates the terminate command to the execution processor in dependence upon the context duration time parameter.

7. The transport stream decoder of claim 6, wherein the execution processor produces application images in response to the execution of the executable code, and the transport stream decoder further includes:
- a video processor that processes the sequence of one or more packets into the video images, and
- a video display, operably coupled to the video processor and the execution processor, that displays the video images and the application images.

8. The transport stream decoder of claim 7, wherein the sequence of one or more video packets have an associated display duration time that is substantially correlated to the context duration time parameter.

9. The transport stream decoder of claim 8, wherein the sequence of one or more video packets has a determinable display start time, and the application processor communicates the launch command to the execution processor to effect the execution of the executable code at a launch time that is substantially equal to the display start time.

10. The transport stream decoder of claim 8, wherein:
- the sequence of one or more video packets contains a display start time,
- the sequence of one or more data packets contains a context start time,
- the video display displays the video images at the display start time, and
- the application processor communicates the launch command to the execution processor so as to effect the execution of the executable code at the context start time.

11. The transport stream decoder of claim 6, wherein the transport stream is an MPEG-compliant transport stream.

12. The transport stream decoder of claim 6, further including a receiver to facilitate the reception of the transport stream from a transport stream encoder.

13. A method for encoding a transport stream comprising the steps of:
- encoding video images into a sequence of one or more video packets,
- determining a display duration time associated with the video images, and
- encoding executable code into a sequence of one or more data packets, the encoding of the executable code including an encoding of a context duration time parameter that is based on at least one of:
  - the display duration time of the video images, and
  - a predetermined maximum duration time of the video images, and
- multiplexing the sequence of one or more video packets and the sequence of one or more data packets to form the transport stream.

14. The method of claim 13, further including the steps of:
- encoding a display start time into the sequence of one or more video packets, and
- encoding a context start time that is based on the display start time into the sequence of one or more data frames.

15. The method of claim 13, further including the step of transmitting the transport stream to facilitate the reception of the transport stream at a transport stream decoder.

16. A method of decoding a transport stream, comprising the steps of:
- demultiplexing a transport stream and producing therefrom a sequence of one or more video packets and a sequence of one or more data packets,
- processing the sequence of one or more data packets and producing therefrom an executable code and a context duration time parameter,
- executing the executable code for a time duration that is based upon the context duration time parameter.

17. The method of claim 16, wherein the step of executing the executable code produces application images, and the method further includes the steps of:
- processing the sequence of one or more video packets to produce video images, and
- displaying the video images and application images on a display device.

18. The method of claim 16, further including the step of receiving the transport stream to facilitate the reception of the transport stream from a transport stream encoder.

* * * * *